Nov. 9, 1965     R. M. BUCHWALD     3,216,760
VEHICLE BODY CLOSURE
Filed April 26, 1963     3 Sheets-Sheet 1

INVENTOR.
Robert M. Buchwald
BY
W. S. Pettigrew
ATTORNEY

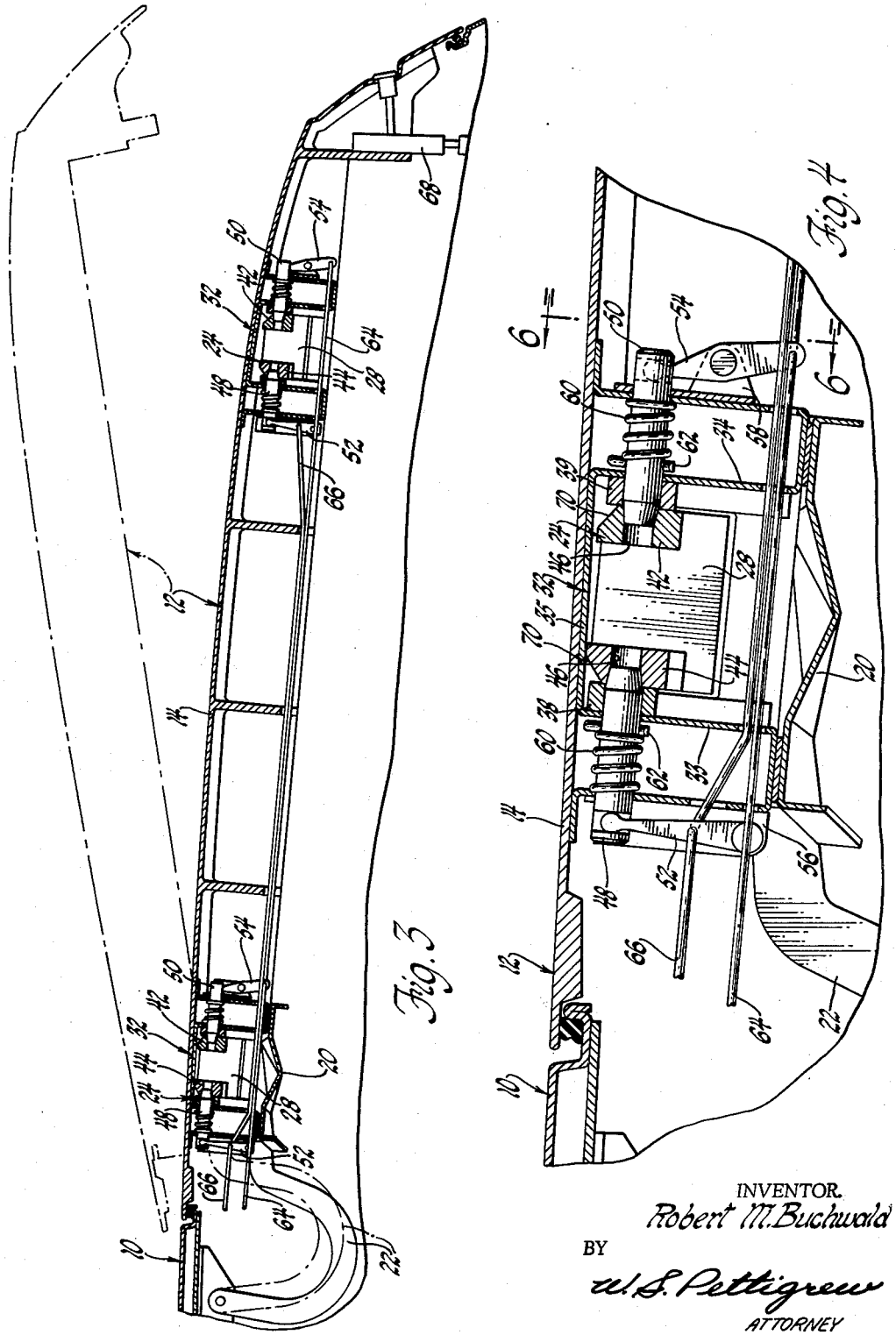

INVENTOR.
Robert M. Buchwald
BY
W. S. Pettigrew
ATTORNEY

United States Patent Office 3,216,760
Patented Nov. 9, 1965

3,216,760
VEHICLE BODY CLOSURE
Robert M. Buchwald, Berkley, Mich., assignor to General Motors Corporation, Detroit, Mich., a corporation of Delaware
Filed Apr. 26, 1963, Ser. No. 275,821
3 Claims. (Cl. 296—76)

This invention relates to vehicle bodies and more particularly to vehicle body closures.

One feature of this invention is that it provides a new and improved vehicle body closure. Another feature of this invention is that it provides a new and improved vehicle body closure assembly movable as a unit between open and closed positions with respect to a vehicle body compartment, and having portions thereof movable independently of the assembly between open and closed positions with respect to portions of the compartment.

The foregoing and other features and advantages of the invention will be readily apparent from the following specification and drawings wherein:

FIGURE 3 is an enlarged sectional view taken generally along the plane indicated by line 3—3 of FIGURE 1;

FIGURE 4 is an enlarged view of a portion of FIGURE 3;

Figure 1:
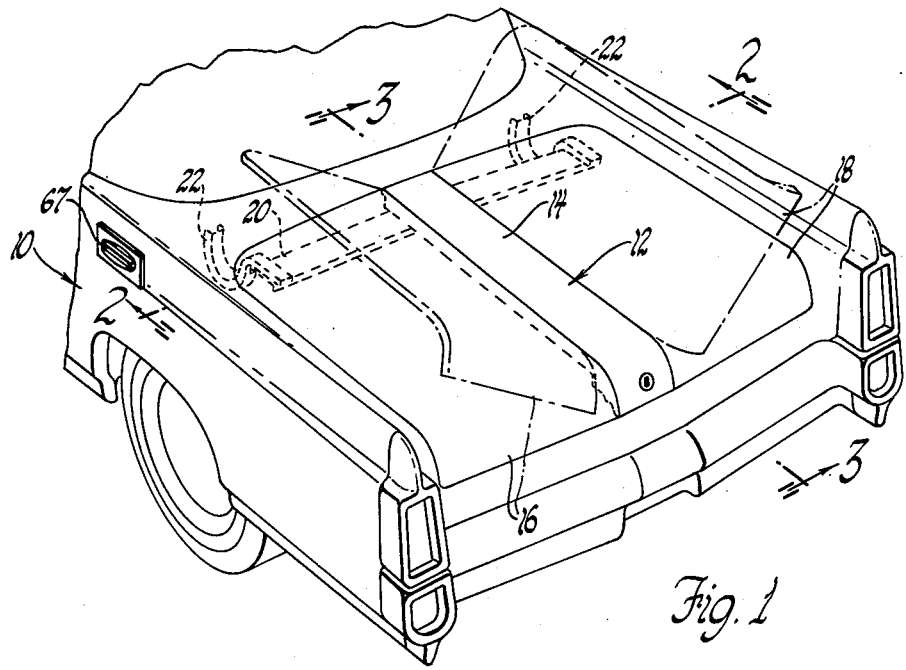
FIGURE 1 is a fragmentary perspective view of a vehicle body embodying a closure according to this invention.

Referring now particularly to FIGURE 1 of the drawings, a vehicle body designated generally as 10 includes a deck compartment and a closure or deck lid 12 according to this invention for closing the compartment. Closure 12 generally includes a center or main support portion or member 14 and a pair of side portions or members 16 and 18. Portion 14 is mounted on a transverse tie plate 20 which is secured to hinge straps 22 mounted on the body in a conventional manner.

As seen in FIGURE 3, side portions 16 and 18 are mounted on portion 14 by forward and rearward hinge and latch assemblies 24 for movement with center portion 14 as a unit or movement independently thereof. The hinge and latch assemblies 24 are identical and only one will be particularly described.

Figure 2:
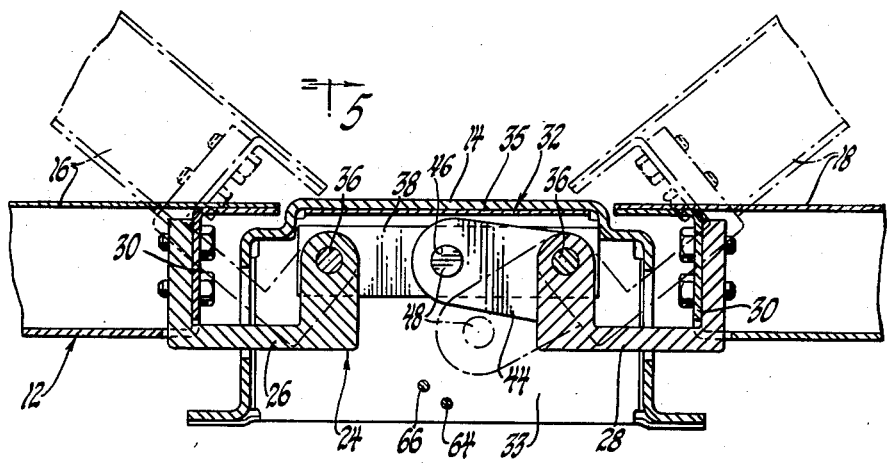
FIGURE 2 is an enlarged sectional view taken generally along the plane indicated by line 2—2 of FIGURE 1.
Figure 5:
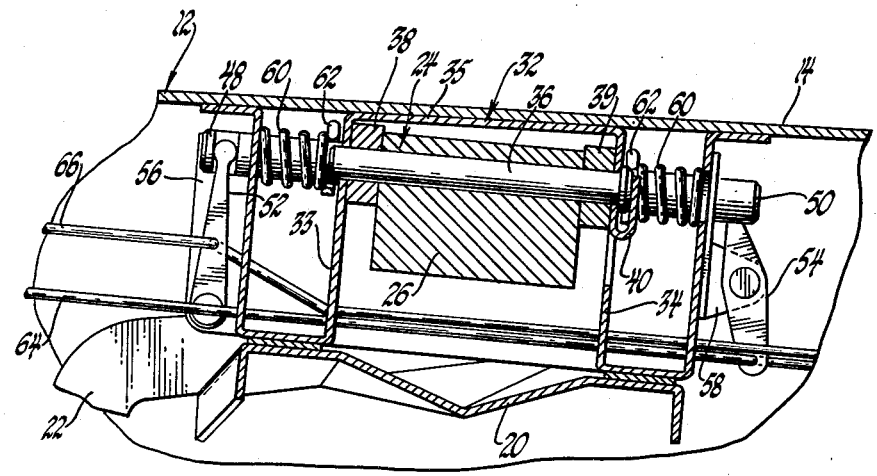
FIGURE 5 is an enlarged sectional view taken generally along the plane indicated by line 5—5 of FIGURE 2.
Figure 6:
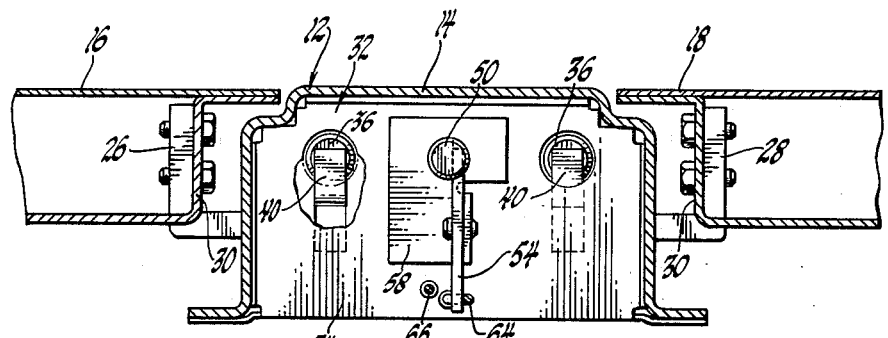
FIGURE 6 is a sectional view taken generally along the plane indicated by line 6—6 of FIGURE 4.
Figure 7:
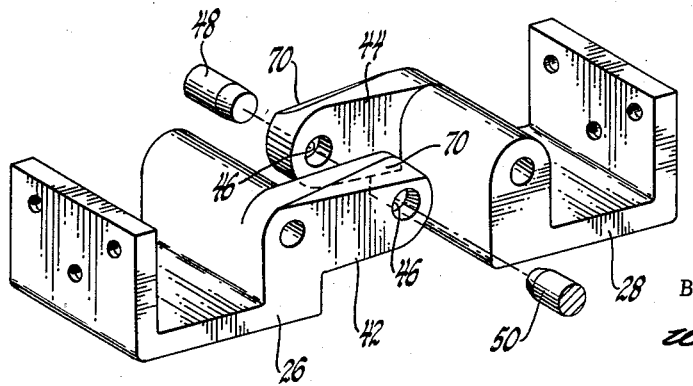
FIGURE 7 is an exploded perspective view.

Referring now to FIGURES 2 and 4, which show the forward hinge and latch assembly, center portion 14 is generally U-shaped in section, with the legs thereof being provided with apertures for receiving a pair of U-shaped hinge members 26 and 28. The outer legs of members 26 and 28 are bolted to longitudinally extending inner flanges 30 of portions 16 and 18 respectively. The inner legs of members 26 and 28 are pivotally mounted by hinge pins 36 on a mounting bracket 32 formed of a pair of channels 33 and 34 and a connecting web portion 35. Web portion 35 and lateral flanges of the channels are secured to center portion 14, and the lower bases of the channels are secured to tie plate 20 to mount portion 14 on the tie plate. As seen best in FIGURE 5, hinge pins 36 extend longitudinally of center portion 14 between inner walls of channels 33 and 34, and through apertures of forward and rearward reinforcing blocks 38 and 39. A return bent tab 40 maintains each pin 36 within the bracket. As shown best in FIGURE 7, each hinge member 26 and 28 is provided wtih a latching lug, 42 and 44 respectively, which extends inwardly of a respective hinge member and is provided wtih a partially tapered aperture 46. When side portions 16 and 18 are in closed position with respect to center portion 14, as shown in full lines in FIGURE 2, apertures 46 are aligned and the lugs 42 and 44 are located adjacent respective reinforcing blocks 39 and 38, as shown in FIGURE 4.

Assembly 24 also includes a pair of latching pins 48 and 50 received within aligned apertures of channels 33 and 34 respectively, and extending through aligned apertures provided in blocks 38 and 39 respectively. The outer ends of pins 48 and 50 are notched to receive the rounded ends of forward and rearward rocking levers 52 and 54, with lever 52 being pivotally mounted on channel 33 by bracket 56, and lever 54 being pivotally mounted on channel 34 by bracket 58. Pins 48 and 50 are provided with tapered inner ends complementary to the tapered apertures 46 of lugs 42 and 44. Compression springs 60 seat between outer walls of channels 33 and 34 and pins 62 of the pins 48 and 50, to urge pins 48 and 50 into the apertures 46 when the side portions 16 and 18 are located in closed position with respect to center portion 14. Pins 48 and 50 thus restrain lugs 44 and 42 respectively against rotation, to hold the side portions in unitary relation with center portion 14 so that closure 12 may be moved as a unit about the hinge axis of straps 22.

Referring to FIGURE 3, a pair of actuating cables 64 and 66 extend longitudinally of center portion 14 through apertures provided in both brackets 32, so as to be operatively connected to both assemblies 24, cable 64 being attached to the rearward rocking lever 54 of each assembly, and cable 66 being attached to each forward rocking lever 52. Cable 64 is turned and guided adjacent the axis of hinge straps 22 toward the left rear fender of body 10 and connected to a suitable operating means 67 located on the exterior thereof, such as a flush-type swingable handle assembly including locking means therefor. Cable 66 is guided in a similar fashion toward the right rear fender to identical operating means located thereon. A suitable deck lid latch 68, FIGURE 3, is provided to hold the center portion 14 in closed position.

When the latching pins 48 and 50 of assemblies 24 are in latched position, as shown in FIGURE 4, closure portions 14, 16 and 18 may be moved to open position as a unit by operating latch 68. Should it be desired that only portion 16 be moved to open position, operating means 67 on the left fender is operated to shift cable 64, rock levers 54, and withdraw pins 50 from lugs 42 of hinge blocks 26. It will be apparent that portion 18 may be opened in the same manner, either individually, or together with portion 16. Suitable biasing means may be provided in the form of torsion springs acting on the hinge blocks 26 and 28 of each assembly 24 or in the form of conventional torque rods extending therebetween, to urge the side portions to a partially open position upon release of the latching pins. When the side portions are in an open position, springs 60 urge pins 62 of the latching pins into engagement with the respective walls of brackets 32, thus to locate the latching pins so as to partially project out of blocks 38 and 39. Thus, to again latch the side portions to center portion 14, the side portions are pressed downwardly to swing the latching lugs 42 or 44 upwardly and cause cam surfaces 70 provided thereon to engage and displace the latching pins until the apertures in the lugs are aligned therewith to allow spring 60 to project the latching pins into the apertures, FIGURE 4.

It is now apparent that this invention provides a new and improved closure assembly including portions movable in unitary relation in a conventional manner longitudinally of the body, or selectively individually movable to open only a portion of the deck compartment. By providing suitable locking and latching means for all three portions of the deck lid, as previously described, unauthorized access is prevented.

Thus a new and improved vehicle body closure is provided.

I claim:
1. In a vehicle body having an opening therein, a closure for said opening, comprising, in combination, a center closure member extending longitudinally of said body, a pair of side closure members pivotally mounted on said center member for movement about longitudinal axes thereof, latch means for relesasably holding said side members in unitary relation with said center member, a pair of spaced hinge members mounted on said body for movement about a transverse axis thereof, a transverse support member interconnecting said hinge members, said center member being mounted on said support member for movement of said closure members about the axis of said hinge members between open and closed positions with respect to said opening, and said means for selectively releasing said latch means to permit said side members to move transversely of said body between open and closed positions independently of movement of said center member.

2. In a vehicle body having an opening therein, the combination comprising, a closure assembly including a main support portion and at least one side closure portion, said side portion being adapted to close an outboard portion of said opening adjacent one side of said body, means swingably mounting said main portion on said body for movement about a transverse axis thereof between open and closed positions with respect to said opening, means on said main portion defining an axis extending longitudinally of said body and located remote from one side of said body and intermediate said one side of said body and the longitudinal centerline thereof, hinge means arranged about said longitudinal axis and swingably mounting said side portion adjacent an inboard edge thereof on said main portion for movement relative to said main portion from a closed position with respect to said opening and carrying the outboard edge of said side portion in a direction toward the other side of said body to an open position permitting access to said opening from said one side of said body, latch means releasably holding said side portion in unitary relation with said main portion for movement therewith about said transverse axis between open and closed positions, and means for selectively releasing said latch means to permit said side portion to move about said longitudinal axis between closed and open positions independently of movement of said main portion.

3. In a vehicle body having an opening therein, the combination comprising, a closure assembly including a center closure portion arranged generally longitudinally of said body and a pair of side closure portions each located to one side of said center portion, means swingably mounting said center portion on said body for movement about a transverse axis of said body between open and closed positions with respect to said opening, hinge means swingably mounting each of said side portions on said center portion for swinging movement relative thereto about an inboard longitudinal axis from a closed position with respect to said opening toward the other side of said body to an open position permitting access to said opening from said one side of said body, latch means releasably holding a respective one of said side portions in unitary relation with said center portion for movement therewith about said transverse axis between open and closed positions, and means for selectively releasing said latch means to permit a selected one of said side portions to move about the longitudinal axis thereof between closed and open positions independently of movement of said center portion and independently of permission of movement of the other of said side portions.

References Cited by the Examiner
UNITED STATES PATENTS

| | | | |
|---|---|---|---|
| 674,320 | 5/01 | Sebring | 296—51 |
| 990,552 | 4/11 | Hassmann | 16—144 |
| 2,215,606 | 9/40 | Dunn | 16—144 X |
| 2,616,739 | 11/52 | Allen | 292—171 |
| 2,747,923 | 5/56 | McLean | 296—76 X |
| 2,901,285 | 8/59 | Walker | 296—76 X |
| 3,012,270 | 12/61 | Reid | 16—144 |

A. HARRY LEVY, *Primary Examiner.*

LEO FRIAGLIA, *Examiner.*

UNITED STATES PATENT OFFICE
CERTIFICATE OF CORRECTION

Patent No. 3,216,760                           November 9, 1965

Robert M. Buchwald

It is hereby certified that error appears in the above numbered patent requiring correction and that the said Letters Patent should read as corrected below.

Column 2, line 1, for "wtih" read -- with --; column 3, line 19, for "and said means" read -- and means --.

Signed and sealed this 6th day of September 1966.

(SEAL)
Attest:

ERNEST W. SWIDER                        EDWARD J. BRENNER
Attesting Officer                          Commissioner of Patents